United States Patent [19]

White

[11] 4,431,061
[45] Feb. 14, 1984

[54] LEVEE SCALPER

[76] Inventor: Garland M. White, Rte. 1, Box 176, Harrisburg, Ark. 72432

[21] Appl. No.: 398,645

[22] Filed: Jul. 15, 1982

[51] Int. Cl.³ .......................... E02F 5/00; A01B 13/02
[52] U.S. Cl. .................................. 172/810; 172/574; 172/483; 172/464; 37/98
[58] Field of Search ............... 172/810, 832, 817, 574, 172/464, 483, 491; 37/98

[56] References Cited

U.S. PATENT DOCUMENTS

| | | | |
|---|---|---|---|
| 1,404,380 | 1/1922 | Erter | 172/464 |
| 2,347,373 | 4/1944 | Silver | 172/834 |
| 2,355,264 | 8/1944 | Couse | 172/810 |
| 2,559,816 | 7/1951 | Alexander | 172/817 |
| 2,582,538 | 1/1952 | Flynn | 172/810 |
| 3,041,751 | 7/1962 | Chatin | 37/98 |
| 3,224,392 | 12/1965 | Mellen | 172/178 X |
| 3,375,878 | 4/1968 | Dorn | 172/483 X |
| 3,800,879 | 4/1974 | Chant | 172/810 |

Primary Examiner—Richard J. Johnson
Attorney, Agent, or Firm—Stephen D. Carver

[57] ABSTRACT

A farm implement adapted to be coupled to the front of conventional tractors for pre-cutting or scalping old levees. A rigid, box-like frame is secured generally transversely upon the front of the tractor. The frame supports an elongated, rigid channel mount extending generally perpendicularly with respect thereto. An elongated, rigid stanchion may be coupled to the channel mount to elevate a first hydraulic cylinder attachment point at a desired elevation above ground. A plow assembly includes a pair of rotatable, angularly disposed forwardly projecting cutting discs rotatably secured to a central frame, and an elongated rigidly upwardly extending strut terminating at its top in a second point for connection with a hydraulic cylinder. Rigid strut guide means are secured about the channel mount at a desired elevation, sandwiching the stanchion therewithin. The strut guide means includes a rigid box which receives the plow assembly strut and permits axial displacements thereof, while resisting or preventing lateral or torsional displacement. A hydraulic cylinder may selectively move the plow assembly into or out of engagement for the levee to be destroyed.

4 Claims, 6 Drawing Figures

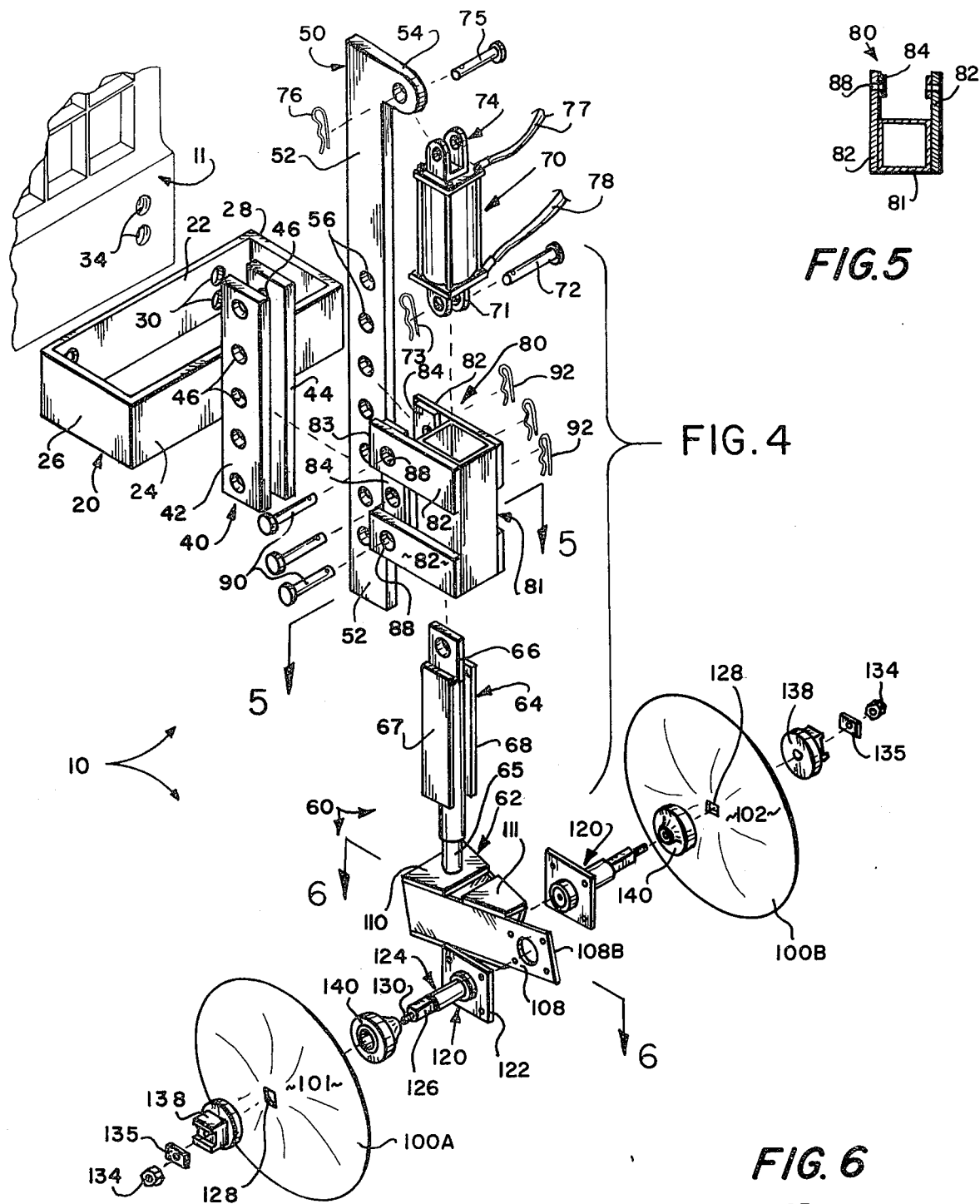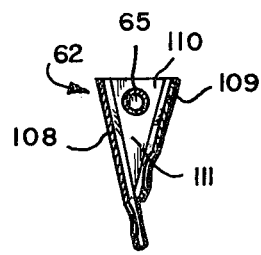

LEVEE SCALPER

BACKGROUND OF THE INVENTION

This invention relates generally to farming implements. More particularly, the present invention relates to a system for pre-cutting old rice levees to prepare them for total destruction by conventional discs towed, for example, at the rear of a tractor.

In Arkansas rice is usually planted between the middle of April and the middle of May. Harvesting may occur between the middle of September and the middle of November. As will be appreciated by those skilled in the rice farming art, standing water is divided into pockets and contained therewithin by levees which facilitate flooding. Before harvesting the rice, the standing water is drained off and the fields are substantially dried. After harvesting, perhaps in the late fall of the year, the field levees are torn up to help prepare the fields for subsequent crop rotation.

Typically rear mounted plows or disc units are towed from tractors to destroy levees and tear up the soil to facilitate subsequent replanting for the next growth cycle. However, particularly in gumbo soil, the plow or disk apparatus may become jammed. This is particularly true when encountering relatively high levees. Another problem with high levees is that they may hit and damage the undercarriage of the towing tractor, which necessarily straddles the levees. Hence, it is desirable to provide some form of front mounted apparatus for pre-treating levees in the destruction process. However, such apparatus must preserve the steering ability of the tractor, and it must be extremely resistant to severe twisting or torsional forces encountered, for example, when tracking curved or irregular levees or when buried obstacles such as rock or the like are hit.

In the prior art a wide variety of agricultural implements have been proposed which may conceivably be employed for levee treatment. U.S. Pat. No. 2,414,994 depicts a bulldozer in which a front mounted plow prepares ground for subsequent pipe installation. Hydraulic means are provided for controlling the apparatus from the front of the bulldozer. U.S. Pat. No. 2,582,538 depicts a bulldozer in which a front mounted pair of angularly inclined discs are employed to treat soil. U.S. Pat. No. 3,224,392 discloses a system including a plurality of angularly arranged discs mounted both at the front and at the rear of a conventional tractor. U.S. Pat. Nos. 2,762,283; 4,181,181 and 3,145,781 broadly depict apparatus controlled through hydraulics which may be mounted at the front of a tractor.

Federal German Pat. No. 962,382 broadly depicts a soil treating system in which a plow assembly is mounted intermediate the front and drive wheels of the tractor device. Canadian Pat. No. 527,071 broadly depicts a tractor implement in which front mounted, angularly inclined discs, along with a plurality of related equipment and parts, are operationally secured at the front end of a tractor.

SUMMARY OF THE INVENTION

The present invention comprises a farm implement which may be secured at the front of a tractor to pre-treat levees prior to their destruction by conventional apparatus towed by a tractor. The device is ideally adapted for use by the rice farmer, and it may be controlled by the tractor driver from his normal operational position, without interfering with operation, visibility or control.

The implement includes a rigid, box-like frame which is generally transversely secured to the front of the tractor. This frame supports a pair of spaced apart channels comprising a mounting system, each of the channels being oriented in spaced relation generally perpendicular with respect to the box-like frame. An elongated, rigid, apertured stanchion is adapted to be pinned between the channel members. Both the channel members and the stanchion include a plurality of spaced apart orifices which may be aligned in registration such that the various components can be pinned together. The upper portion of the stanchion is elevated above ground at a suitable position to support a hydraulic cylinder.

A rigid strut guide system is also pinned about the channel members, with the stanchion sandwiched in between. This guide system includes a generally rectilinear, tubular rigid guide which receives a control strut projecting upwardly from the lower plow assembly. The plow assembly includes a rigid central mounting frame which rotatably mounts a pair of angularly inclined discs which forcibly engage the levee to be treated. The upwardly projecting strut axially penetrates the strut guide, but torsional and lateral displacement therewithin is prevented. The upper portion of the strut is coupled to the hydraulic cylinder, and the cylinder may thus raise or lower the plow assembly as desired by the tractor operator.

Thus a broad object of the present invention is to provide a system for pre-treating rice levees.

More particularly, an object of the present invention is to provide a tractor mounted system for pretreating or precutting levees after the harvest season to facilitate subsequent complete destruction of the levees.

Yet another object of the present invention is to prevent rice levees from damaging or contacting the undercarriage of the tractor.

Another important object of the present invention is to provide a levee precutting system of the character described which does not interfere with steering or operation of the tractor upon which the unit is mounted.

Yet another object of the present invention is to provide a levee treatment device of the character described which may be axially displaced between levee engaging and transporting positions, while at the same time resisting torsional or lateral stress forces.

Another broad object of the present invention is to facilitate the destruction of rice levees without the use of bulldozers.

Yet another object of the present invention is to provide a pre-treatment system for levees which increases the operational efficiency of trailing plows, harrows, discs or the like.

A still further object of the present invention is to provide a levee pre-treatment device of the character described which may be field mounted or removed by the farmer with simple retaining pins.

A basic object is to avoid the "high centering" problem typically encountered by rice farmers when destroying levees.

Thus a related object is to avoid getting the tractor stuck.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout to indicate like parts in the various views:

FIG. 4 is an enlarged, exploded, fragmentary isometric view of the levee scalper assembly of FIGS. 1 through 3;

FIG. 5 is a sectional view taken generally through line 5—5 of FIG. 4; and,

FIG. 6 is a sectional view taken generally through line 6—6 of FIG. 4.

DETAILED DESCRIPTION OF THE DRAWINGS

Figure 1:
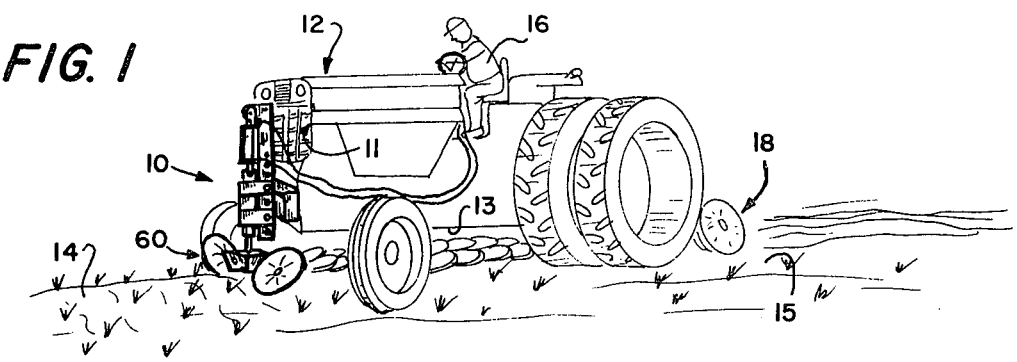
FIG. 1 is a pictorial view illustrating a tractor destroying a levee, with the present levee scalper installed and operational at the front thereof, with a rear towed disc cooperating therewith.
Figure 2:
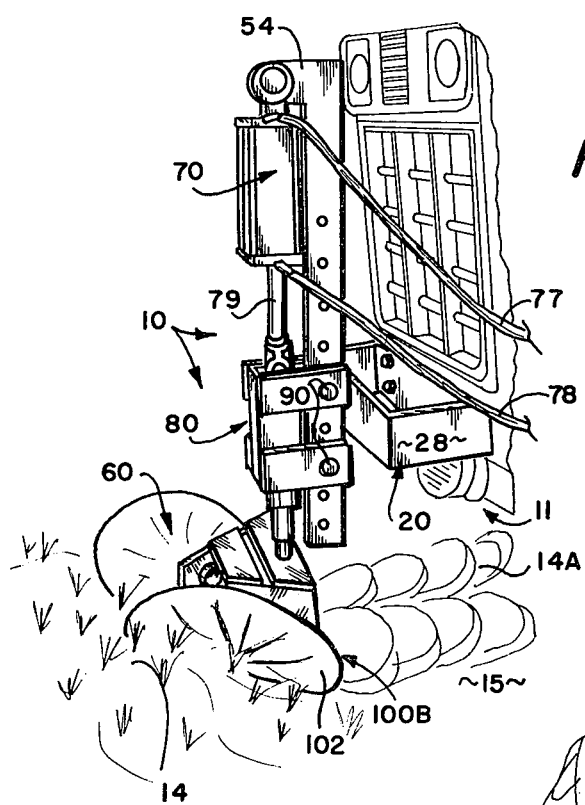
FIG. 2 is an enlarged, fragmentary isometric view of the front of the tractor of FIG. 1, illustrating the plow assembly of the present invention engaged within a levee to be removed.
Figure 3:
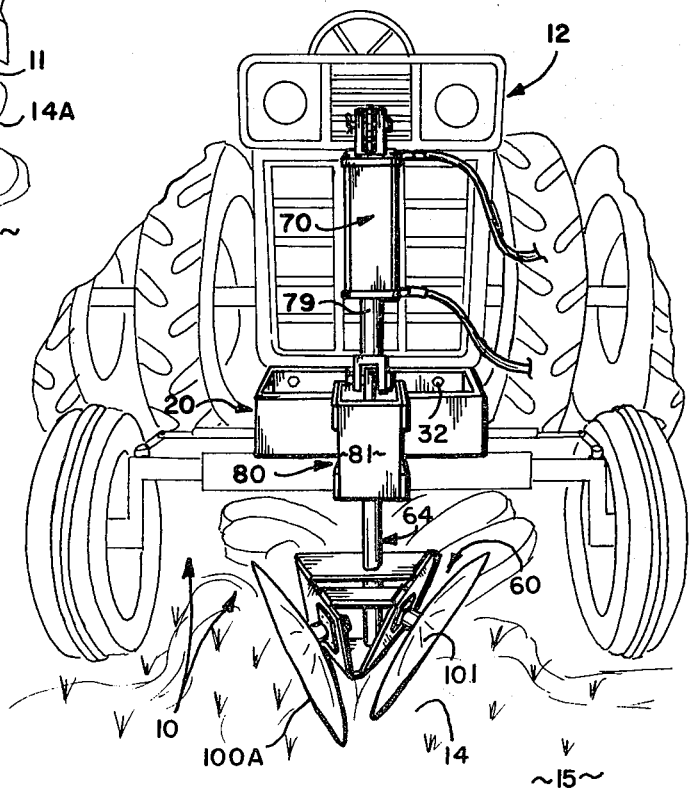
FIG. 3 is a frontal fragmentary view of the apparatus of FIGS. 1 and 2.

With initial reference to FIGS. 1-3, a levee scalper constructed in accordance with the teachings of the present invention has been generally designated by the reference numeral 10. Scalper 10 is preferably mechanically secured to the front 11 of a conventional farm tractor 12. In FIG. 1 scalper 10 is illustrated pretreating a levee 14 which is to be destroyed. Prior to planting a new crop, farmer 16 destroys the levee 14 with a conventional rear towed disc or harrow assembly, generally designated by the reference numeral 18. Scalper 10 aides farmer 16 by pretreating levees 14 so they may be totally destroyed by the trailing disc assembly 18 dragged about the field 15. Once the rigid, main box-like frame portion of the scalper 10 is rigidly bolted to the front 11 of the tractor 12, the remaining parts, as will later be described, may be field mounted or removed with conventional pins. Moreover, scalper 10 is remotely controlled by driver 16 with hydraulic apparatus, as will hereinafter be described. As best seen in FIG. 1, scalper 10 does not interfere with the view of driver 16.

With additional reference now to FIGS. 4 through 6, the scalper 10 includes a rigid, box-like frame assembly, generally designated by the reference numeral 20, of generally rectangular dimensions. Frame 20 includes a rigid, steel cross piece 22 secured in parallel, spaced relation with respect to rigid front piece 24 by a pair of ends 26, 28. Suitable apertures 30 are provided in frame piece 22 so that conventional bolts 32 (FIG. 3) may secure frame 20 to tractor front 11, being received within suitably tapped orifices 34.

A rigid channel-mount assembly, generally designated by the reference numeral 40, is rigidly secured to frame 20 in generally perpendicular, centered relation with respect thereto. Channel mount assembly 40 includes a pair of spaced apart apertured, parallel steel plates 42, 44 welded to frame plate 24. A plurality of orifices 46 are provided in aligned relationship in each of the channel plates 42, 44 for purposes to be hereinafter described.

An elongated, rigid stanchion, generally designated by the reference numeral 50, is adapted to be installed within the channel mount 40 between plates 42 and 44. Stanchion 50 includes an elongated, rigid body 52 terminating in an upper, rigid coupling 54. Body 52 includes a plurality of orifices 56 adapted to be aligned with orifices 46 (in channel mount 40) for installation.

A plow assembly generally designated by the reference numeral 60 is operatively supported by stanchion 50. The plow assembly 60 includes a generally V-shaped central frame, generally designated by the reference numeral 62, and an elongated, upwardly projecting rigid strut member, generally designated by the reference numeral 64. Strut member 64 terminates in an upper, second coupling 66 adapted to be coupled to a conventional hydraulic cylinder 70. Rigid, strut guide means, generally designated by the reference numeral 80, is provided to guide and receive the strut member 64 of plow assembly 60. The strut guide means 80 includes a generally vertically oriented tubular guide box mounted in spaced, offset relation relative to channel mount 40 (and stanchion 50) by a plurality of generally horizontally oriented legs 82. The inwardly projecting ends 83 of the legs 82 are reinforced with generally vertically projecting reinforcements 84, suitably welded thereto. As best illustrated in FIG. 4, the legs 82 (and reinforcements 84) will be positioned on opposite, outer sides of the channel mount plates 42, 44 when the apparatus is assembled. The strut guide means 80 includes aplurality of suitable mounting apertures 88 adapted to be aligned with the orifices 46 defined in channel plate 42, 44 and, of course, the orifices 56 within the stanchion assembly 50. When assembled, a plurality of conventional pins 90 penetrate appropriately aligned orifices to secure stanchion 50 and strut guide assembly 80 in proper operative relation relative to channel assembly 40. Pins 90 may be removed or installed in the filed, and they are secured by conventional retainer clips 92.

It will be appreciated by those skilled in the art that stanchion 50 may be moved vertically and positioned as desired by the operator relative to the channel mount 40. Also, guide box 80 may be positioned as desired relative to the channel mount 40 (and stanchion 50). Adjustments in the placement of guide box 80 and stanchion 50 relative to channel mount 40 must be made by the installer such that proper operational placement of hydraulic cylinder 70 may be effectuated. It is desirable such that the lower plow assembly 60 will be moved completly out of the way of the levee 14 when cylinder 70 is in a withdrawn position. Moreover, proper operational installation must insure that extension of cylinder 70 will force the plow assembly 60 firmly into the levy 14.

Hydraulic cylinder 70 is conventional. It includes a ram 79 terminating in a lower clevis mount 71 adapted to be pinned to second coupling 66 on strut assembly 64 by a conventional retainer 73. Similarly, upper clevis fitting 74 is attached to first coupling 54 (part of stanchion 50) by conventional pin 75 retained by clip 76. A pair of conventional hydraulic hoses 77, 78 conventionally power cylinder 70 to actuate its ram 79 (FIGS. 2, 3) whereby to control the plow assembly 60.

The plow assembly 60 includes a pair of spaced apart conventional discs 100A, 100B which are rotatably secured to the central frame assembly 62. The concave sides 101 of the discs are oriented towards the outside of the assembly; the convex inner sides 102 of the discs 100 are oriented facing each other towards central frame 62.

In other word, the convex disc faces 102 project inwardly towards each other. As best viewed in FIGS. 2 and 3, the discs 100A, 100B are also oriented in a plane angularly inclined relative to ground 15. Moreover the discs 100A, 100B are positioned in planes which angularly converge towards the front of the apparatus.

Central frame 62 is of generally triangular cross section (FIG. 6). It includes a rigid elongated first side 108 and a cooperating, intersecting second side 109 of shorter length than side 108. Upper cross webs 110, 111 reinforce frame 62. Disc 100A is rotatably secured to end 108B of central frame side plate 108. Disc 100B is rotatably secured somewhat farther back than disc 100A in engagement with side plate 109. Each of the discs 100A, 100B are mounted with similar equipment. For example, a conventional bearing assembly 120 includes a base plate 122 secured to the central frame side. An outwardly projecting axle, generally designated by the reference numeral 124, includes a key lock portion 126 which penetrates disc orifice 128. A conventional nut 134 is secured to threaded stem 130, bushings 138, 140 sandwiching the disc therebetween.

The strut assembly 64 includes a central stem portion 65 extending upwardly and braced by side braces 67, 68 which conform the strut assembly 64 to the generally rectangular dimensions interiorly of guide box 81. In this manner axial displacement of the strut assembly 64 upwardly or downwardly with guide box 81 is facilitated. Moreover, it will be apparent that twisting forces experienced by strut assembly 64 will be resisted by the configuration of the guide block box assembly 81.

During installation the frame assembly 20 is first bolted to the tractor front 11. Afterwards, the stanchion 50 is oriented within guide 40 such that the hydraulic cylinder 70 employed by farmer 16 provides suitable displacements of the plow assembly 60. Pins 90 may be installed in the manner previously described to position stanchion 50 and the guide means 80 in proper operative alignment. When operation commences, farmer 16 will suitably activate cylinder 70 by pressuring lines 77, or 78. With the plow assembly 60 forced firmly into levee 14, the levee will be precut such that the trailing disc or harrow assembly 18 will throughly level it. Moreover, during this critical operation, the underside 13 of the tractor will clear the pretreated levee 14A (FIG. 2).

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A rigid, hydraulically controlled levee scalper for use with conventional farm tractors or the like for precutting old levees, the scalper comprising:

rigid, box like frame means adapted to be secured to the front of said tractor or the like;

rigid channel mount means secured to the front of said frame means in generally perpendicular relation therewith;

elongated, rigid stanchion means adapted to be secured within said channel mount means, an upper end of said stanchion means terminating in a first coupling adapted to be coupled to a hydraulic cylinder assembly;

plow assembly means including a pair of rotatable cutting discs oriented in a generally V-shaped configuration pointing generally forwardly of said tractor for engaging a levee, the plow assembly means including disc-supportive, central frame means and elongated strut means rigidly coupled to said central frame means and extending vertically upwardly therefrom, said strut means terminating in an upper, second coupling adapted to be coupled to said hydraulic cylinder assembly and responsive to said hydraulic cylinder assembly for moving said central frame means and thus said discs between levee engaging and levee disengaging positions; and, rigid strut guide means adapted to be secured about said channel mount means and including guide box means for receiving said strut means, said guide box means permitting axial displacement of said strut means relative thereto while resisting torsional or lateral displacements thereof.

2. The combination as defined in claim 1 wherein:

said channel mount means is provided with a plurality of spaced apart, aligned mounting orifices; and, said stanchion means is provided with a plurality of spaced apart mounting orifices adapted to be aligned in registration with selected ones of said channel mount means orifices; whereby said stanchion means upper end may be selectively positioned at a desired operational distance above said box-like frame means.

3. The combination as defined in claim 2 wherein said strut guide means includes a plurality of spaced apart mounting orifices adapted to be aligned in registration with said channel mount means orifices and said stanchion means orifices to facilitate semi-permanent field pinning of said strut guide means relative to said stanchion means and said strut guide means.

4. The combination as defined in claim 3 including hydraulic cylinder means adapted to be coupled between said first and second couplings for selectively engaging or disengaging said plow assembly means.

* * * * *